United States Patent [19]

Bilow et al.

[11] 3,928,450

[45] Dec. 23, 1975

[54] ACETYLENE SUBSTITUTED AROMATIC PRIMARY AMINES AND THE PROCESS OF MAKING THEM

[75] Inventors: Norman Bilow; Robert H. Boschan, both of Los Angeles; Abraham L. Landis, Northridge, all of Calif.

[73] Assignee: Hughes Aircraft Company, Culver City, Calif.

[22] Filed: Nov. 16, 1973

[21] Appl. No.: 416,709

[52] U.S. Cl. .............................. 260/571; 260/578
[51] Int. Cl.$^2$ .................................... C07C 93/14
[58] Field of Search ........................... 260/571, 578

[56] References Cited
UNITED STATES PATENTS

| | | | |
|---|---|---|---|
| 2,350,900 | 6/1944 | Johnson | 260/578 |
| 3,202,698 | 8/1965 | Prichard | 260/578 X |
| 3,406,202 | 10/1968 | Reifschneider et al. | 260/578 |
| 3,544,637 | 12/1970 | Kober et al. | 260/571 X |
| 3,755,449 | 8/1973 | Ito et al. | 260/571 |
| 3,844,956 | 10/1974 | Nnadi | 260/571 X |
| 3,852,289 | 12/1974 | Mylari et al. | 260/578 X |
| 3,852,364 | 12/1974 | Diamond | 260/578 X |
| 3,887,620 | 6/1975 | Glamkowski et al. | 260/571 |

Primary Examiner—Paul F. Shaver
Attorney, Agent, or Firm—W. H. MacAllister; B. T. Hogan, Jr.

[57] ABSTRACT

Acetylene substituted aromatic primary amines have been prepared by a method that yields a new class of compounds which by virtue of their stereo chemistry impart greater tractability and solubility to acetylene substituted polyimide oligomers. Compounds prepared by this method are useful as intermediates in the preparation of polyimide oligomers exhibiting lower melting points and improved solubilities.

3 Claims, No Drawings

ACETYLENE SUBSTITUTED AROMATIC PRIMARY AMINES AND THE PROCESS OF MAKING THEM

The invention herein described was made in the course of or under a contract or subcontract with the United States Air Force.

CROSS-REFERENCE TO RELATED APPLICATIONS

Compounds similar to the present invention were disclosed in application Ser. No. 347,502 filed Apr. 3, 1973.

BACKGROUND OF THE INVENTION

1. Field of the Invention

The invention disclosed in this application deals with the art of making acetylenic substituted compounds with primary aromatic amines.

2. Description of the Prior Art

Aminophenylacetylene is a compound known to the art. A search of the literature will show that the conventional method of producing this compound can be characterized as rather difficult and capable of producing only low yields. In application Ser. No. 347,502, a method for preparing aminoarylacetylenes which constituted a significant improvement in the state of this art as well as a new class of compounds having the following formula: H$_2$N—R—C ≡ CH wherein R is

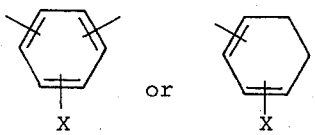

and X is hydrogen, methyl, phenyl, methoxy, fluoro or chloro was disclosed. The utility of these compounds provided the incentive for further research leading to the discovery of the class of compounds disclosed by our invention and the process for making them. There is no prior art known to the inventors which can be characterized as directly related to this invention.

SUMMARY OF THE INVENTION

We have discovered a process for preparing primary aromatic amines which produce a new class of compounds of the structure NH$_2$—R—C ≡ CH where R is diphenylene oxide or diphenylene sulfide. Our method allows one to achieve para or meta substitutions with the amine or acetylene groups as desired to avoid steric hindrance.

Compounds prepared by our invention are useful as intermediates in the preparation of acetylene-substituted polyimide oligomers which exhibit lower melting points and better solubility characteristics than that obtained when aminophenylacetylene is used as an intermediate.

DESCRIPTION OF THE INVENTION

We have discovered that the acetylene-substituted polyimide oligomers derived from amino-phenoxyphenyl acetylenes and homologues thereof exhibit lower melting points and superior solubility characteristics to the analogues derived from compounds in which there is no aryloxy or arylthio ether grouping in the center of the structure. The meta substitution of the acetylene group relative to the —C$_6$H$_4$O— or —C$_6$H$_4$—S— groups is deemed to be of importance in that the resulting angle formed between the two aromatic rings prevents the polyimide oligomers from having a perfectly linear axis, thus introducing asymmetry into the molecular structure.

3(4-aminophenoxy)phenylacetylene of our invention can be made according to the following general reaction:

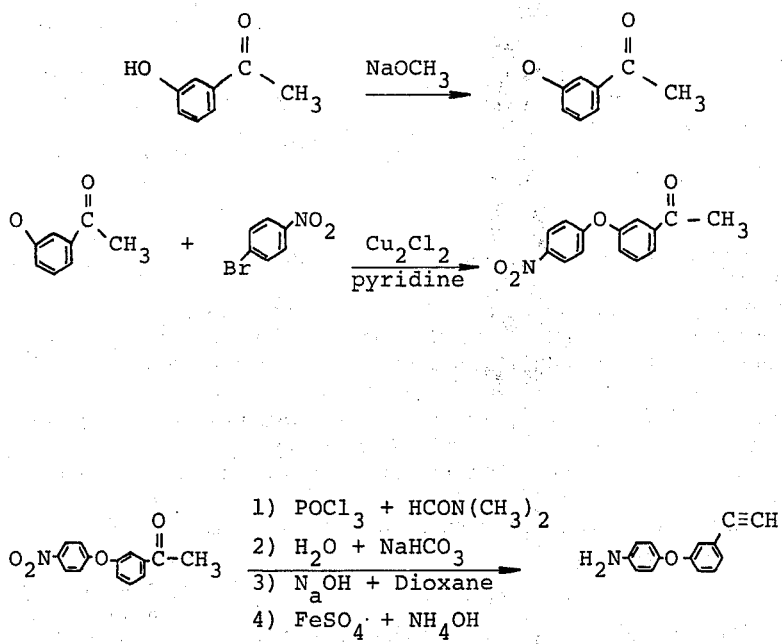

By substituting the corresponding mercaptan in the above procedure, the corresponding thioether may be obtained.

The following compounds may be obtained by various perturbations of the general synthesis steps shown above.

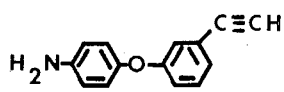 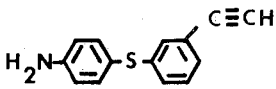

3(4-aminophenoxy)phenylacetylene  3(4-aminophenylthio)phenylacetylene

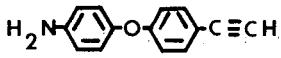 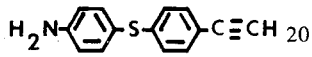

4(4-aminophenoxy)phenylacetylene  4(4-aminophenylthio)phenylacetylene

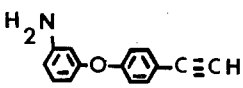 

4(3-aminophenoxy)phenylacetylene  4(3-aminophenylthio)phenylacetylene

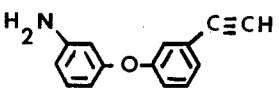 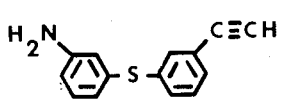

3(3-aminophenoxy)phenylacetylene  3(3-aminophenylthio)phenylacetylene

It is to be recognized that alkylated and arylated derivatives thereof are also included, provided that the alkyl or aryl groups do not introduce excessive steric hindrance and reduce the activity of the amino or ethynyl groups. For example, 3(4-amino-2-methylphenoxy)phenylacetylene and 5-methyl-3(4-aminophenoxy)phenylacetylene and their thio analogues would also be useful.

Examples of specific compound preparations of this class are shown below:

EXAMPLE I

Preparation of 3(4-nitrophenoxy)-acetophenone

To a slurry of sodium methoxide (11.4 grams, 0.21 mole) in dry benzene (100 ml), a solution of 3-hydroxyacetophenone (27.2 grams, 0.20 mole) in dry benzene (100 ml) was added dropwise under argon. After heating the mixture at reflux for one-half hour, the sodium salt was recovered by evaporating the solution to dryness in an argon atmosphere. To this salt was added a cold solution of 1-bromo-4-nitrobenzene (42.2 grams, 0.21 mole) in deaerated pyridine (200 ml) under argon. Then finely powdered cuprous chloride (3.5 grams) was added to the reaction mixture. The reaction mixture was then heated at a gentle reflux rate for 8 hours. Most of the solvent was removed on the rotary evaporator. The residue was triturated with ice water (500 ml) and acidified with hydrochloric acid. The mixture was extracted with benzene in several portions. The benzene extract was then extracted repeatedly with dilute hydrochloric acid. Finally the phenolic impurities were extracted out with aqueous 5 percent sodium hydroxide solution and water. After drying the benzene solution over anhydrous potassium carbonate, the benzene was removed on the rotary evaporator. The product, when purified by sublimation, had a m.p. of 90°–100°C and weighed 9 grams (18 percent yield). Analysis of the product showed the following results. Theoretical for $C_{14}H_{11}NO_4$: C, 65.37; H, 4.31; N, 5.46; O, 24.88. Found: C, 65.21; H, 4.23; N, 5.38; O, 25.26.

EXAMPLE II

To a solution of dry 3-hydroxyacetophenone (42.7 grams, 0.31 mole) in dry benzene (500 ml), sodium methoxide (18.0 grams, 0.33 moles) was added under argon. After heating the mixture at reflux for 1 hour, the sodium salt was recovered by evaporating the solution to dryness in an argon atmosphere. To this salt was added a cold solution of 1-bromo-4-nitrobenzene (75 grams, 0.37 mole) in deaerated pyridine (500 ml) under argon. Then finely powdered cuprous chloride (6.2 grams) was added. The reaction mixture was then heated at a gentle reflux for 18 hours. Most of the solvent was removed on the rotary evaporator. The residue was treated with ice water (1000 ml) and the mixture acidified with hydrochloric acid and extracted with benzene in several portions. The benzene extract was then extracted first with dilute hydrochloric acid, then with water and finally with 5 percent sodium hydroxide solution and water. After drying the benzene solution over anhydrous potassium carbonate, the benzene was removed on the rotary evaporator. The product, when purified by recrystallization from ethanol, had a m.p. of 98°–100°C and weighed 25.5 grams (32 percent yield).

EXAMPLE III

Preparation of 3(4-nitrophenoxy)-1-(1-chloro-2-formylvinyl)benzene

Phosphorus oxychloride (5.4 grams, 0.35 mole) was added dropwise to cold dimethylformamide (4.7 ml). The reaction mixture was kept at 20°–25°C by external cooling. After the addition, external cooling was discontinued and the solution was stirred for one-half hour. Then a solution of 3-(4-nitrophenoxy)acetophenone (6.0 grams) in anhydrous dimethylformamide (50 ml) was added dropwise, keeping the pot temperature at 40°C. The mixture was stirred overnight. The mixture then was poured into cold saturated sodium bicarbonate solution (600 ml). This crude product was extracted with benzene. Removal of the benzene on the rotary evaporator yielded an oily product. Methods of purifying this product are presently being investigated.

EXAMPLE IV

Preparation of 3(4-nitrophenoxy)phenylacetylene

A solution of the 3(4-nitrophenoxy)-1-(1-chloro-2-formylvinyl)benzene (22 grams, 0.76 mole, in 100 ml dioxane) was added slowly to a refluxing aqueous solution of sodium hydroxide (7.6 grams in 60 ml water). After addition, the reaction mixture was refluxed an hour.

The crude product was evaporated on a rotary still to about one-third of its original volume, and then poured into 200 ml of ice water. The resulting brown gummy product was extracted with 50 ml portions of ether. Ethereal portions were dried over anhydrous potassium carbonate, evaporated over a steam bath, and recrystallized from ethanol. (Product had a tendency to oil out, even though sparingly soluble in Ethanol.) The mother liquor was set aside for further crystallization.

EXAMPLE V

Reduction of 3(4-nitrophenoxy)phenylacetylene to 3(4-aminophenoxy)phenylacetylene To a solution of ferrous sulfate heptahydrate (925 grams, 3.25 moles) in water (1500 ml) heated at its reflux temperature, a solution of 3(4-nitrophenoxy)-phenylacetylene (88 grams, 0.37 mole) in ethanol (500 ml) was added slowly under argon so that even reflux was maintained throughout the addition. After the addition, the reaction mixture was heated at reflux for 2 hours more. Concentrated ammonium hydroxide (310 ml) was added and the mixture heated for an additional three-fourth hour at reflux. After allowing the reaction mixture to stand at room temperature overnight, additional concentrated ammonium hydroxide (230 ml) was added and the total volume increased two-fold with water to facilitate separation of the phases during the extraction with ether. The reaction mixture was extracted with ether, the ether evaporated on the steam bath and the residue degassed and purified by column chromatography.

EXAMPLE VI

Reaction of 3(4-aminophenoxy)phenylacetylene with benzophenonetetracarboxylic dianhydride in molar ratio of 2:1

To a solution of benzophenonetetracarboxylic dianhydride (16.1 grams, 0.05 mole) in dry dimethylformamide (50 ml), heated at reflux, a solution of 3(4-aminophenoxy)phenylacetylene (20.9 grams, 0.10 mole) in dry dimethylformamide (50) was added dropwise. The reaction mixture was stirred at reflux for 1 hour. The solvent was removed on the rotary evaporator and to the residue were added m-cresol 100 ml) and benzene (150 ml). The mixture was heated at total reflux with a Dean-Stark water trap. After 1 hour, 1.0 ml of water and 80 ml of benzene were removed from the trap. The mixture was heated at total reflux overnight during which time an additional 0.3 ml of water collected in the trap. The benzene/m-cresol mixture was removed in the rotary evaporator. The residue was thoroughly washed with absolute ethanol and dried in a vacuum oven at 80°C overnight. The dried product weighed 25 grams and had a melting point below 275°C.

EXAMPLE VII

Acetylene-terminated polyimide from benzophenonetetracarboxylic dianhydride, 1,3-di(3-aminophenoxy) benzene and 3(4-aminophenoxy)phenylacetylene in molar ratios of 2:1:2

To a solution of benzophenonetetracarboxylic dianhydride (110.2 grams, 0.343 mole) in dry dimethylformamide (430 ml) heated at reflux, a solution of 1,3-di(3-aminophenoxy)benzene (49.9 grams, 0.171 mole) in dry dimethylformamide (430 ml) was added dropwise over a 1 hour period. The mixture was heated at reflux for 30 minutes and then a solution of 3(4-aminophenoxy)phenylacetylene (71.6 grams, 0.342 mole) in dimethylformamide (200 ml) was added. The mixture was heated at reflux for 1 hour and then allowed to stand over the weekend at ambient temperature. The solvent was removed with the rotary evaporator and to the residue was added m-cresol (350 ml) and benzene (150 ml). The mixture was heated at total reflux with a Dean-Stark water trap. After 3 hours, 3 ml of water along with 50 ml of benzene were removed from the trap. The mixture was heated at total reflux overnight during which time an additional 4.6 ml of water was collected. The benzene/m-cresol mixture was removed on the rotary evaporator. The residue was thoroughly washed with absolute ethanol and dried in a vacuum oven overnight at 80°C. The dried product weighed 210 grams.

EXAMPLE VIII

Preparation of 3(3-nitrophenoxy)acetophenone

Sodium methoxide was prepared by adding absolute methanol (18 g, 0.56 mole) in benzene (150 ml) to a rapidly stirred dispersion of sodium sand (12.5 g, 0.50 mole) in dry benzene (500 ml). During the addition, the solution refluxed gently. After the addition, the mixture was allowed to stand overnight in a flask protected against moisture. Then the freshly prepared sodium methoxide slurry was added all at once to a solution of 3-hydroxyacetophenone (68.2 g, 0.50 mole, recrystallized from benzene) in dry benzene (500 ml), the solution was heated at reflux for several hours with vigorous stirring in an argon atmosphere, and the solvent removed by distillation using an oil bath at 115°C. The final traces of solvent were removed by vacuum distillation. The contents of the flask were allowed to cool to room temperature, after which finely powdered anhydrous cuprous chloride (10.0 g) and a solution of 1-bromo-3-nitrobenzene (110 g, 0.54 mole) in dry deaerated pyridine (600 ml) were added and the mixture heated at reflux under argon for 18 hours. The reaction mixture was filtered hot through a Buchner funnel to remove inorganic salts and the mother liquor was concentrated on the rotary evaporator. The resulting oily residue was dissolved in 1000 ml of toluene and washed with 1:1 by volume hydrochloric acid to remove any pyridine, then with 10 percent aqueous sodium hydroxide until the washings were colorless, and finally with water containing a small amout of sodium chloride. The toluene was removed on the rotary evaporator and the oily residue triturated in several portions with cold ethanol (0°C). Fresh portions of ethanol were used until the oily residue solidified. The ethanol washings contained mostly unreacted 1-bromo-3-nitrobenzene. The solidified residue was recrystallized from ethanol to yield bright-yellow crystals, m.p. 70°–72°C, 27.0 g, representing a 21 percent yield. Analysis of the product showed the following:

Theory for $C_{14}H_{11}O_4N$: C,65.37; H,4.31; N,5.45; O,24.88. Found: C,65.30; H,4.41; N,5.33.

EXAMPLE IX

Preparation of 3(3-nitrophenoxy)-β-chlorocinnamaldehyde

Method A

Phosphorus oxychloride (45.9 g, 0.3 mole) was added to dimethylformamide (70 ml) with constant stirring. The reaction mixture was kept at 20°–25°C by external cooling. After the addition the solution was stirred for 2½ hours. Then a solution of 3(3-nitrophenoxy)acetophenone (51.4 g, 0.20 mole) in anhydrous dimethylformamide (100 ml) was added dropwise. The temperature rose to a maximum of 40°C and then dropped to ambient. The mixture was stirred overnight, then poured into cold saturated sodium bicarbonate solution, and the crude product isolated by extraction with ethyl ether. The ether extract was washed with water to remove any dimethylformamide and the ether evaporated on the rotary evaporator. The solid yellow product (44.2 grams) was recrystallized from isopropyl alcohol to yield bright yellow crystals, m.p. 76°C. Analysis of the product showed the following:

Theory for $C_{15}H_{10}NO_4Cl$:C,59.42; H,3.30; N,4.62; Cl,11.71. Found: C,59.51; H,3.27; N,4.55; Cl,11.61.

EXAMPLE X

Preparation of 3(3-nitrophenoxy)-β-chlorocinnamaldehyde

Method B

Phosphorus oxychloride (96 g, 0.63 mole) was added to dimethylformamide (140 ml) with constant stirring. The temperature rose to 35°C and then dropped to ambient. After the addition, the solution was stirred for an additional hours. Then a solution of 3(3-nitrophenoxy) acetophenone (106 g, 0.40 mole) in dimethylformamide (200 ml) was added dropwise over a 1.5 hour period. The temperature rose to a maximum of 54°C and then dropped to ambient. The solution was allowed to stand overnight. It was then brought up to 64°C for 1 hour, cooled to ambient temperature and poured into cold saturated sodium bicarbonate solution, and the product isolated with ethyl ether. The ether extract was washed with water to remove any dimethylformamide and dried over anhydrous potassium carbonate. The ether was evaporated on the rotary evaporator to yield 99.6 grams (82.7 percent of theory) of a yellow solid.

EXAMPLE XI

Preparation of 3(3-nitrophenoxy)phenylacetylene

To a refluxing solution of sodium hydroxide (27 g, 0.68 mole) in water (265 ml) was added a solution of 3(3-nitrophenoxy)-β-chlorocinnameldehyde (99.6 g, 0.33 mole) in dioxane (265 ml) at such a rate that refluxing did not stop. The addition required 45 minutes. The mixture was heated at reflux for an additional 30 minutes. Then a total of 250 ml of solvent was removed by evaporation on the rotary evaporator. The heavy oily product was removed and the aqueous layer extracted with ether and the ether extract combined with the oily layer. Then the ether solution was washed with water to remove any remaining dioxane and dried over Drierite. The ether was distilled off on a water bath, the final traces being evaporated off on the rotary evaporator. A total of 61.4 grams (84.3 percent of theory) was obtained. This product was recrystallized from ethanol to yield bright yellow crystals, m.p. 64°–66°C.

EXAMPLE XII

Preparation of 3(3-aminophenoxy)phenylacetylene

To a refluxing solution of ferrous sulfate heptahydrate (265 g, 0.95 mole) in water (375 ml) was added, over a period of 40 minutes, a solution of 3(3-nitrophenoxy)phenylacetylene (30.0g, 0.126 mole) in dioxane (300 ml) under argon. Refluxing was continued for an additional 1½ hours, after which concentrated ammonium hydroxide (150 ml) was added. Refluxing was continued for an additional 1½ hours and the mixture was allowed to cool under argon overnight.

The mixture was extracted with ethyl ether and the extract evaporated on the rotary evaporator. The residue, which weighed 22.9 grams, had a neutralization equivalent of 323 (theory 209) and showed the presence of nitro groups when analyzed by infrared spectroscopy. These groups showed up at 6.6 and 7.4 microns on the spectrogram. It appears that the reduction had not gone to completion. The product, containing unreduced 3(3-nitrophenoxy)phenylacetylene, was reworked by adding a solution of this product (22.1 g) in dioxane (150 ml) to a refluxing solution of ferrous sulfate heptahydrate (135 g) in water (175 ml) under argon. To the refluxing mixture, concentrated ammonium hydroxide (150 ml) was added. An additional portion (50 ml) was added after 1 hour and the reacton mixture heated at reflux overnight.

The reaction product was diluted with an equal volume of water and the mixture extracted with ethyl ether. The ether was evaporated on the rotary evaporator. The residue, a thick oily liquid, weighed 21.1 grams and had a neutralization equivalent of 289 which showed that further reduction of the nitro groups had taken place. The product was then purified using acid treated activated alumina in a column. column. An aliquot portion of the product was added to the column and developed with benzene. The various fractions were eluted with benzene containing 1 percent methanol. The best fraction has a neutralization equivalent of 229 (theory 209).

EXAMPLE XIII

Preparation of N,N'-[3-(3'-ethynylphenoxy)phenyl] benzophenone- 3,4,3',4'-tetracarboxylic diamide To a solution of 3(3-aminophenoxy)phenylacetylene (1.48 gms, neut. equiv. 262 corresponding to 79 percent purity, 0.00564 moles) in several ml of dimethylformamide was added a solution of benzophenonetetracarboxylic dianhydride (0.82 grams, 0.0026 mole) in several ml of dimethylformamide. The solution was heated at reflux for 1 hour and the solvent distilled on the rotary film evaporator. To the residue was added 3.5 ml of benzene and 7.0 ml of cresol. The solution was heated at reflux overnight and then the solvent distilled off on the rotary evaporator. The residue was titurated with absolute ethanol and the residue filtered, washed with fresh ethanol and dried. A yield of 0.80 grams was obtained. The residue started to soften at 175°C and by 185°C was a mobil fluid which, upon further heating, rapidly cured to a hard tough transparent solid.

What is claimed is:

1. A class of compounds comprised of the formula NH$_2$—R—C≡CH wherein R is phenoxy phenylene or phenylene thiophenylene.

2. Compounds of claim 1 consisting of the following structures:

a) 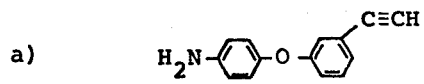

b) 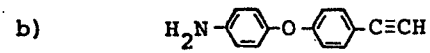

c) 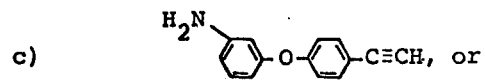

d) 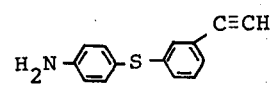

3. Compounds of claim 1 consisting of the following structures:

a) 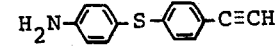

b) 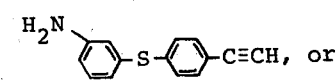

c) 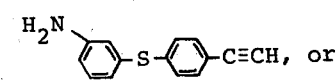

d) 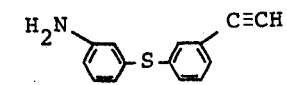

* * * * *